US010047477B2

(12) United States Patent
Blackwell, Jr. et al.

(10) Patent No.: US 10,047,477 B2
(45) Date of Patent: Aug. 14, 2018

(54) TEXTILE COATING COMPOSITION

(71) Applicant: Kraton Polymers US LLC, Houston, TX (US)

(72) Inventors: Richard Ivey Blackwell, Jr., Katy, TX (US); Jacey Cegura, Houston, TX (US); Hoa Pham, Cypress, TX (US); Kuitian Tan, Katy, TX (US); Marc S. Sonderman, Purmerend (NL)

(73) Assignee: Kraton Polymers U.S. LLC, Houston, TX (US)

( * ) Notice: Subject to any disclaimer, the term of this patent is extended or adjusted under 35 U.S.C. 154(b) by 997 days.

(21) Appl. No.: 14/243,046

(22) Filed: Apr. 2, 2014

(65) Prior Publication Data

US 2015/0284901 A1 Oct. 8, 2015

(51) Int. Cl.

| | |
|---|---|
| ***D06M 15/233*** | (2006.01) |
| ***C09D 153/02*** | (2006.01) |
| ***D06M 15/227*** | (2006.01) |
| ***D06M 15/333*** | (2006.01) |
| ***D06M 15/356*** | (2006.01) |
| ***D06M 23/16*** | (2006.01) |
| ***D06N 3/04*** | (2006.01) |
| ***D06N 3/10*** | (2006.01) |

(52) U.S. Cl.

CPC ....... *D06M 15/233* (2013.01); *C09D 153/025* (2013.01); *D06M 15/227* (2013.01); *D06M 15/333* (2013.01); *D06M 15/3566* (2013.01); *D06M 23/16* (2013.01); *D06N 3/04* (2013.01); *D06N 3/045* (2013.01); *D06N 3/10* (2013.01); *D06N 2209/123* (2013.01); *Y10T 442/20* (2015.04)

(58) Field of Classification Search

CPC ............ D06M 15/233; D06M 15/227; D06M 15/333; D06M 15/3566; D06M 23/16; C09D 153/025; D06N 3/04; D06N 3/045; D06N 3/10

USPC ........................................................ 524/503

See application file for complete search history.

(56) References Cited

U.S. PATENT DOCUMENTS

| | | | | |
|---|---|---|---|---|
| 6,448,323 | B1 * | 9/2002 | Jordan | C08K 3/34 524/145 |
| 2003/0176582 | A1 | 9/2003 | Bening et al. | |
| 2004/0122151 | A1 * | 6/2004 | Smith | C08L 51/003 524/425 |

FOREIGN PATENT DOCUMENTS

| | | | | |
|---|---|---|---|---|
| EP | 2242137 A1 | | 10/2010 | |
| WO | 2007010039 A1 | | 1/2007 | |
| WO | WO 2007010039 A1 | * | 1/2007 | B01D 69/10 |

* cited by examiner

*Primary Examiner* — Ling Siu Choi
*Assistant Examiner* — Ronald Grinsted
(74) *Attorney, Agent, or Firm* — Jessica Zimberlin Eastman; Cantor Colburn LLP

(57) ABSTRACT

The current invention concerns a textile coating composition comprising an aqueous emulsion of a midblock sulfonated styrenic block copolymer and a poly(vinyl alcohol). It also concerns a method for preparing the textile coating composition and its application. It also concerns fabrics on which the coating compositions have been applied.

24 Claims, 1 Drawing Sheet

TEXTILE COATING COMPOSITION

FIELD OF THE DISCLOSURE

Figure 1:
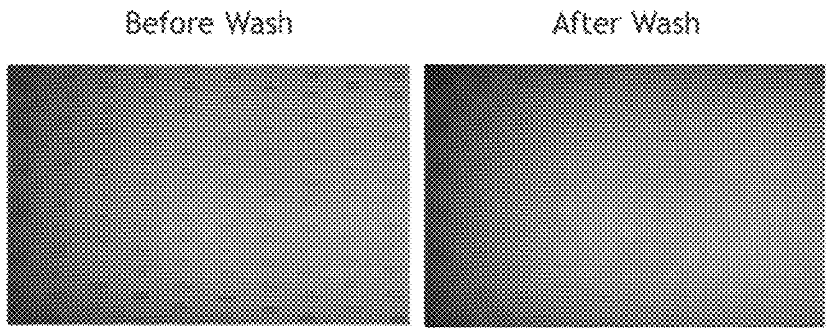

The current invention concerns textile coating composition. More in particular, the invention concerns a textile coating composition based on sulfonated block copolymers, specifically styrenic block copolymers having sulfonated midblocks. It also concerns fabrics on which the coating compositions have been applied.

BACKGROUND OF THE DISCLOSURE

Midblock sulfonated styrenic block copolymers are known. Typically, they are sulfonated block copolymers based on styrene and/or t-butyl styrene with the former predominantly used in a midblock, that is subsequently sulfonated and the latter in the endblocks, that resist sulfonation. These polymers are in a solid state in the presence of water and have both high water transport properties and sufficient wet strength. These polymers are known to have excellent barrier properties.

From WO Pat. No. 2007010039 a midblock sulfonated styrenic block copolymer is known. This block copolymer is based on a block copolymer that comprises at least two polymer end blocks A and at least one polymer interior block B wherein each A block is a polymer block resistant to sulfonation and each B block is a polymer block susceptible to sulfonation, and wherein said A and B blocks do not contain any significant levels of olefinic unsaturation.

Such polymers are now commercially available for instance under the trademark Nexar® from Kraton Polymers. The typical structure of a Nexar molecule is a penta-block consisting of two poly(t-butylstyrene) (tBS) blocks, two poly(ethylene/propylene) (EP) blocks (hydrogenated polyisoprene), and in the middle a partly sulfonated polystyrene (sPS) block.

Such midblock sulfonated block copolymers are typically delivered to customers as a solution of about 10% in a combination of heptane and cyclohexane. For some customers this poses a problem because they are not used to handling this type of solvent and do not have adequate ventilation and disposal systems in place. Organic solvent may cause various handling problems due to the high volatility and low flame point of such solvents. The possibility to deliver such polymers as an aqueous emulsion would be a solution. Moreover, a waterborne system is more environmental friendly. Preparing a suitable aqueous emulsion, however, is not without its own problems.

Because of its excellent water transport properties, these polymers may be used in textile coatings. When used in textile coatings, the polymer swells and binds with moisture. The moisture may then be released to the environment. It thereby provides an enhanced evaporative cooling effect that exceeds other technologies. These coatings are therefore highly attractive to the performance fabric markets, including protective clothing, active outerwear, bedding, military and intimate apparel.

However, there is a growing demand that such coatings (a) can be applied solvent-free (which refers to organic solvents mentioned above), and (b) survive multiple laundering cycles without visual loss of coating and/or loss of performance.

The inventors set out to solve this problem.

SUMMARY OF THE INVENTION

Accordingly, the present invention concerns a coating composition comprising an aqueous emulsion of a midblock sulfonated styrenic block copolymer and a poly(vinyl alcohol). It also concerns a method for preparing said coating composition, which comprises: forming an aqueous emulsion of a midblock sulfonated styrenic block copolymer in water, bringing the aqueous emulsion to a temperature in the range of 50 to 100° C., and dissolving the poly(vinyl alcohol) into the emulsion.

Furthermore, the present invention concerns a method for applying the coating composition of the current invention onto a fabric, which comprises: applying the coating composition onto a fabric, and applying heat and optionally pressure. Coatings that may withstand a minimum of 50 wash cycles on most substrates may be made.

DETAILED DESCRIPTION OF THE DRAWINGS

FIG. 1 is an image of a fabric on which an unmodified coating composition is applied in the form of dots. The image on the left is before washing. The image on the right is after a single wash cycle. It can be seen that a large number of coating dots have disappeared. The fabric has thereby lost its enhanced cooling properties.

Figure 2:
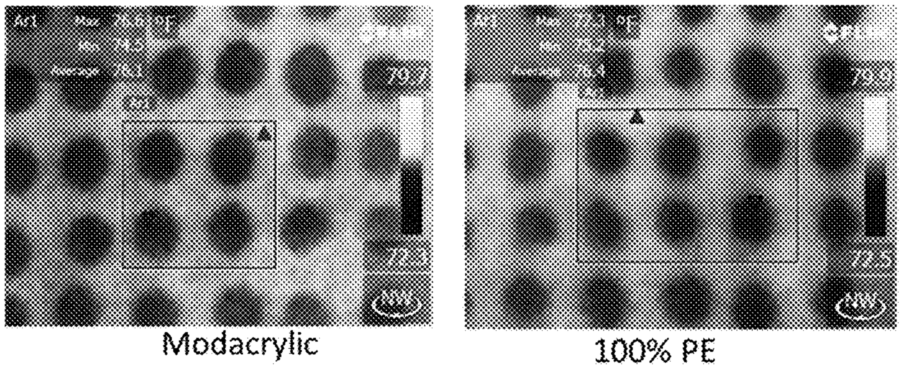

FIG. 2 is a combination of two enlarged images of different fabrics, on which a modified coating composition is applied, after 50 wash cycles. The images illustrate enhanced evaporative cooling effect on two different fabrics coated with the emulsion. The fabrics were subjected to a 40% RH gradient after equilibrating at 80% RH. Images were captured with an infrared camera. The images illustrate that the coating composition is still present and that the evaporative cooling properties are still intact.

DETAILED DESCRIPTION OF THE EMBODIMENT

The present invention broadly comprises a coating composition comprising an aqueous emulsion of a midblock sulfonated styrenic block copolymer. Also a mixture of midblock sulfonated styrenic block copolymers may be used. The block copolymer comprises at least two non-sulfonated polymer end-blocks A, and at least one interior styrenic polymer block B carrying sulfonyl groups and/or derivatives thereof. Optionally the midblock sulfonated styrenic block copolymer may comprise one or more interior polymer blocks D that have a glass transition temperature of less than 20° C. Such midblock sulfonated styrenic block copolymers are known from WO Pat. No. 2007010039, from EP Pat. No. 2242137 and others.

The expression "resistant to sulfonation" is sometimes used with respect to the end blocks A. This means that less than about 10 mol % of all the available sulfonyl groups in the sulfonated styrenic block copolymer are in the A blocks. The expression "resistant to sulfonation" if used with respect to the blocks D, will mean that less than about 15 mol % of all the available sulfonyl groups in the sulfonated styrenic block copolymer are in the D blocks.

The expression block copolymer refers to a polymer having distinguishable blocks. These blocks have different properties and are typically immiscible in each other. Typically, the block copolymer has multiple, distinct glass transition temperatures. An important difference between end-block sulfonated block copolymers and midblock sulfonated styrenic block copolymers is that in the latter the A blocks can provide a hydrophobic matrix, even if the midblock sulfonated block copolymer is in contact with water. The polymer behaves as if it is cross-linked. This is important for the stability of e.g. membranes made from such sulfonated block copolymers. The interior B block on the other hand will be hydrophilic as a result of the sulfonyl groups or the derivatives thereof that are present in this block. The D blocks, if any, may have properties ranging from hydrophobic to hydrophilic, provided, they do not adversely affect the stability of the articles made of the sulfonated block copolymers when in contact with water. Preferably, they are hydrophobic.

The midblock sulfonated block copolymers may be linear or branched. Preferred structures have the general configuration A-B-A, $(A\text{-}B)_n(A)$, $(A\text{-}B\text{-}A)_n$, $(A\text{-}B\text{-}A)_nX$, $(A\text{-}B)_nX$, A-B-D-B-A, A-D-B-D-A, $(A\text{-}D\text{-}B)_n(A)$, $(A\text{-}B\text{-}D)_n(A)$, $(A\text{-}B\text{-}D)_nX$, $(A\text{-}D\text{-}B)_nX$ or mixtures thereof, where n is an integer from 2 to about 30, X is coupling agent residue and A, B and D are as defined hereinbefore.

For midblock sulfonated styrenic block copolymers wherein each A block has an apparent number average molar mass below 1,000 said blocks may be too small to ensure sufficient strength. For midblock sulfonated styrenic block copolymers wherein each A block has an apparent number average molar mass above 60,000 said blocks may be too big in respect to the blocks B. In that case the block copolymer may have insufficient conductivity. It may also be more difficult to process as a result of the increased overall molecular weight.

A distinguishing feature of block copolymers which have been selectively sulfonated in an interior block is that they can be formed into objects having a useful balance of properties that have heretofore been unachievable, including strength even when equilibrated with water, water vapour transport behaviour, dimensional stability, and processability. The hydrophobic blocks and their position at the ends of the block copolymer chain contribute to the wet strength, dimensional stability and processability of these polymers and objects formed from them. The sulfonated block(s) positioned in the interior of the copolymer allow effective water vapour transport. The combined properties afford a unique material ideally suitable for coatings.

The sulfonated styrenic block copolymers may be made from corresponding unsulfonated styrenic block copolymers by sulfonation (reaction with $SO_3$ or with a $C_2$ to $C_8$ acyl sulfate, as described in WO Pat. No. 200710039, incorporated herein by reference). These unsulfonated styrenic block copolymers may be defined by the same structural formulae, wherein A and D have the same meaning (since A is resistant to sulfonation and D preferably is resistant to sulfonation), but wherein B', instead of B, is the corresponding block before sulfonation.

Most preferred structures are either the linear A-B-A, $(A\text{-}B)_2X$, $(A\text{-}B\text{-}D)_2X$ and $(A\text{-}D\text{-}B)_2X$ structures or the radial structures $(A\text{-}B)_nX$ and $(A\text{-}D\text{-}B)_nX$ where n is 3 to 6. The block copolymers prior to sulfonation are typically made via anionic polymerization, cationic polymerization or Ziegler-Natta polymerization. Preferably, these unsulfonated block copolymers are made via anionic polymerization. It is recognized that in any polymerization, the polymer mixture will include a certain amount of A-B diblock copolymer, in addition to any linear and/or radial polymers. The most preferred structure is A-D-B-D-A, made by sulfonating the corresponding A-D-B'-D-A.

Preferably a) each A block independently is a polymer block having an apparent number average molar mass between 1,000 and 60,000, more preferably between 5,000 and 40,000, still more preferably between 7,000 and 20,000; and/or b) each D block, if present, independently is a polymer block having an apparent number average molar mass between 1,000 and 60,000, more preferably between 2,000 and 40,000, still more preferably between 5,000 and 20,000, and/or c) each B block independently is a polymer block having an apparent number average molar mass between 10,000 and 300,000, more preferably between 15,000 and 200,000, still more preferably between 19,000 and 100,000.

As used in this specification and claims, the term "molar mass" refers to polystyrene equivalent, or apparent, molar mass of the polymer or block of the copolymer, measured with gel permeation chromatography (GPC) using polystyrene calibration standards, such as is done according to ASTM D5296-11. GPC is a well-known method wherein polymers are separated according to molecular size, the largest molecule eluting first. The chromatograph is calibrated using commercially available polystyrene molar mass standards. The detector used is preferably a combination ultraviolet and refractive index detector. The molar mass expressed herein is measured at the peak of the GPC trace.

Preferably, the sulfonated styrenic block copolymer has a B block content in the range of 10 to 85 percent by mass (% m), preferably in the range of 20 to 60% m, more preferably 25 to 50% m, calculated on the mass of the sulfonated block copolymer. Such block copolymers will be insoluble in water and non-dispersible in water. The hydrophobic units of the end blocks and optional D blocks contribute to the block copolymer's insolubility. Furthermore, if the B block mass content approaches high values where the sulfonated block copolymers become soluble, hydrophobicity of the entire styrenic block copolymer can be adjusted by incorporating hydrophobic monomer units into the interior blocks, including A blocks as well as B blocks.

An important feature of the sulfonated styrenic block copolymers used in the emulsions of the current invention is that they have sufficient sulfonic groups per molecule (which definition includes salts and acid derivatives that allow transport of water). Preferably the sulfonated block copolymer has a content of sulfonic groups in the range of 0.2 to 4.0, preferably 0.3 to 3.0, more preferably 0.5 to 2.5 mmol per gram polymer. This is also referred to as Ion Exchange capacity in sulfonic groups by mass. (The value in meq/g and mmol/g coincide, since the charge of the sulfonyl group is one).

With respect to the sulfonated styrenic block copolymers that are made from an unsulfonated styrenic block copolymer, preferably each A block independently is made of monomers that resist sulfonation. Such monomers may be selected from: (i) para-substituted styrenes; (ii) ethylene; (iii) alpha olefins of 3 to 18 carbon atoms; (iv) 1,3-cyclodienes; (v) conjugated dienes; (vi) acrylic esters, (vii) methacrylic esters, and (viii) mixtures of monomers (i) to (vii). Where sulfonation conditions are selected that will react with any residual olefinic unsaturation (e.g., in case of block copolymers based on diene monomers in the endblocks), the olefinic unsaturation is preferably removed, for instance by hydrogenation. To ensure the blocks A provide a strong matrix, preferably the blocks have a glass transition temperature in excess of 30° C. For instance, if diene monomers are used, then preferably they are polymerized in a 1,4-fashion. More preferably, each A block comprises a polymer or a copolymer of a para-substituted styrene.

The para-substituted styrenes that are considered suitable monomers may be selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrenes are para-t-butylstyrene and para-methylstyrene, with para-t-butylstyrene (tBS) being most preferred. Monomers may be mixtures of monomers, depending on the particular source. It is desired that the overall purity of the para-substituted styrenes be at least 90% m, preferably at least 95% m, and even more preferably at least 98% m of the desired para-substituted styrene used as monomer.

Other preferred monomers that may form the basis of an A block include ethylene; propylene, butylene, hexane or octane; 1,3-cyclohexadiene, 1,3-cycloheptadiene and 1,3-cyclooctadiene; 1,3-butadiene and/or isoprene (preferably hydrogenated); and various (meth)acrylic esters.

If the B block is made from sulfonated monomers, then the A blocks may also comprise other monomers that would normally undergo sulfonation. Preferably the sulfonated polymer is made by sulfonating an unsulfonated block copolymer, and therefore preferably the A blocks contain little or no monomers that would normally undergo sulfonation.

Thus, the A blocks may contain up to 15 mol % of the vinyl aromatic monomers mentioned for incorporation in the B blocks. In some embodiments, the A blocks may contain up to 10 mol %, preferably they will contain only up to 5 mol %, and particularly preferably only up to 2 mol % of the vinyl aromatic monomers mentioned for incorporation in the B blocks.

However, in the most preferred embodiments, the A blocks will contain no vinyl aromatic monomers mentioned for incorporation in the B blocks. Accordingly, the sulfonation level in the A blocks will be 0 or close to 0 (expressed in mol percent of the total monomers in the A block). In the preferred embodiments therefore the A blocks will provide a strong hydrophobic matrix even if the sulfonated styrenic block copolymer is in contact with water.

The sulfonated styrenic block copolymer may optionally comprise one or more D blocks, providing elasticity. Preferably, said D blocks comprise a polymer or copolymer or a hydrogenated polymer or copolymer of a conjugated diene or a mixture of the conjugated diene with a copolymerizable monomer. The conjugated diene is preferably selected from isoprene, 1,3-butadiene and mixtures thereof, of which between 20 and 80 mol % is built into the (co)polymer in a 1,2-addition fashion. Most preferably, said D blocks are hydrogenated blocks of polymerized isoprene (EP). Another example of a suitable D block would be an acrylate or silicone polymer. In still another example, the D block would be a polymer of isobutylene.

The advantage of a D block or D blocks is an increased elasticity/toughness of the products made from the sulfonated block copolymer. Whereas the sulfonation level in the A blocks is preferably 0 or close to 0 mol %, some sulfonation of the D block or D blocks is permissible. The level of sulfonation depends on a number of aspects, amongst others relating to the size of the D block(s) and the size of the A blocks.

Furthermore, the sulfonated styrenic block copolymers comprise at least one B block, wherein each B block is made of sulfonated monomers or monomers that can be sulfonated after polymerisation. Sulfonated monomers, preferably sulfonated styrenic monomers, include the various sulfonylvinylstyrene monomers.

Preferably the sulfonated styrenic block copolymers are made by sulfonating the corresponding unsulfonated styrenic block copolymer wherein each B' block is made of monomers that can be sulfonated after polymerisation. These monomers are preferably vinyl aromatic monomers selected from (i) unsubstituted styrene, (ii) ortho-substituted styrenes, (iii) meta-substituted styrenes, (iv) alpha-methylstyrene, (v) 1,1-diphenylethylene, (vi) 1,2-diphenylethylene and (vii) mixtures thereof, with styrene being most preferred. During sulfonation all or part of the vinyl aromatic monomers are sulfonated, resulting in—for instance—sulfonated polystyrene (sPS).

Each B block or B' block may be a homopolymer or copolymer. For instance, this may be a random or tapered copolymer of a sulfonated or unsulfonated vinyl aromatic monomer with other vinyl aromatic monomers and/or with one or more conjugated dienes. These blocks may also have a controlled distribution of monomers, similar to the polymers disclosed in U.S. Publ. No. 2003/0176582, which disclosure is herein incorporated by reference. Use of a copolymer may be advantageous to influence the amount of sulfonic groups in the B blocks. This is particularly advantageous when the sulfonated block copolymer is made by sulfonating selectively the interior block of an unsulfonated block copolymer.

For instance, in the interior block of the unsulfonated styrenic block copolymer used for the preparation of the sulfonated styrenic block copolymer the mol percent of vinyl aromatic monomers which are unsubstituted styrene, ortho-substituted styrene, meta-substituted styrene, alpha-methylstyrene, 1,1-diphenylethylene, and/or 1,2-diphenylethylene in the or each of the interior B' blocks is from about 10 to about 100 mol %, preferably from about 25 to about 100 mol %, more preferably from about 50 to about 100 mol %, even more preferably from about 75 to about 100 mol % and most preferably 100 mol %. Note that the ranges can include all combinations of mol percents listed herewith.

As for the level of sulfonation, typical levels are where each B block contains one or more sulfonic functional groups. Preferred levels of sulfonation are 10 to 100 mol % based on the mol percent of vinyl aromatic monomers which are unsubstituted styrene, ortho-substituted styrene, meta-substituted styrene, alpha-methylstyrene, 1,1-diphenylethylene, and 1,2-diphenylethylene in each B block, more preferably about 20 to 95 mol % and even more preferably about 30 to 90 mol %. Note that the range of sulfonation can include all combinations of mol percents listed herewith. The level of sulfonation can be determined by titration of a dry polymer sample, which has been redissolved in tetrahydrofuran with a standardized solution of NaOH in a mixed alcohol and water solvent. When the level of sulfonation is below the mentioned limit, then the conductivity is adversely affected. Sulfonation close to 100% may be too much effort to be economically feasible. The preferred ranges provide the more attractive balance in properties and economic feasibility.

With regard to the anionic polymerization process to prepare the polymers, frequently used solvents are cyclic alkanes, such as cyclopentane, cyclohexane, cycloheptane, and cyclooctane. Consequently, the midblock sulfonated block copolymers are frequently supplied as a solution using said solvents optionally in admixture with other hydrocarbon solvents such as heptane. For some customers this poses a problem because they are not used or equipped to handle this type of solvent. The possibility to deliver the midblock sulfonated block copolymer as an emulsion would be a solution. Apart from this, the process by which the emulsion is generated would give the producer of the sulfonated block copolymers the possibility to recover the organic solvents for potential re-use.

The amount of sulfonated block copolymer and poly (vinyl alcohol) in the coating composition, commonly referred to as solids content, is calculated by weight. Preferably, the solids content is as high as feasible, to keep transportation costs low. On the other hand, the coating composition has to remain stable and sufficiently fluid to be manageable by the users. Preferably, the coating composition has a solids content in the range of 5 to 70 wt. %, preferably in the range of 10 to 50 wt. %.

The current invention also concerns the preparation of a coating composition comprising an aqueous emulsion, i.e., a mixture of the solid phase and the aqueous phase that are normally immiscible. In this case it concerns a stable emulsion, wherein the solid phase does not separate quickly over time, with fine polymer particles.

Emulsification procedures are well-known and common procedures may be applied in the current invention. Quite some literature has been published about emulsification by high shear. A lot of publications concentrate on separate mechanisms playing a role, e.g. droplet breakup, surface tension, dynamic surface tension. During the process of emulsification, when droplets become smaller, it will become progressively more difficult to decrease the size of the droplets further. Droplet size may also depend on the type of surfactant used, if any. Viscosity can also be of importance. The midblock sulfonated block copolymers of the current invention typically have a relatively high viscosity, making it more difficult to from emulsions with small particle sizes.

The midblock sulfonated block copolymers can be emulsified via indirect or by direct emulsification. With the former procedure water is added to the dissolved polymer, first creating a water in oil emulsion, which after addition of more and more water inverts into an oil in water emulsion.

Direct emulsification may be carried out by adding the dissolved polymer to water while stirring. Initially large particles are formed, which may then be broken down for instance by the high shear. It may be useful that a surfactant is present in the water phase, to lower the interfacial tension between the oil and the water phase, and to provide stabilization of the particles formed. The particle diameters may to a certain extent be influenced by adjusting the shear rate and by changing the surfactant concentration. However, the desire to reduce the average particle diameter remains.

The preferred procedure for preparing emulsions of midblock sulfonated block copolymers is by direct emulsification. Preferably, a solution of the sulfonated block copolymer in a volatile organic solvent (with a boiling temperature below that of water) and water are mixed and turned into an emulsion, typically with the aid of a homogenizer. For instance, for lab scale experiments an Ultra-Turrax™ T25 or T50 may be used; for large-scale experiments a Danfoss™ VLT5000 rotor-stator setup may be used. Interestingly, as described hereafter, the sulfonated block copolymers do not require the presence of a surfactant to create a stable emulsion. However, a surfactant may be used.

Having mixed the solution of the sulfonated block copolymer and water, next the organic solvent is removed by stripping. This may be at atmospheric pressure, whilst heating above the boiling temperature of the organic solvent used for the preparation of the solution of the sulfonated block copolymer, or at a reduced pressure. For example, for lab scale experiments the solvent may be stripped from an emulsion first at atmospheric pressure at the temperature close to boiling water, followed by a further reduction of the residual solvent in a rotary evaporator setup.

Moreover, the resulting emulsion has preferably a content of hydrocarbon solvents of less than 5 wt. %, preferably less than 1 wt. %.

The emulsion may be used to coat to textile substrates to generate a cooling effect. However, the wash durability in an unmodified emulsion is not sufficient It has been found that the number of wash cycles may be greatly improved by including poly(vinyl alcohol) into the coating composition.

Aqueous poly(vinyl alcohol) coating compositions are known. Poly(vinyl alcohol) or PVA for short, for instance, is used as film coating composition for use in coating pharmaceutical tablets (e.g., U.S. Pat. No. 6,448,323, and many others). Interestingly, these compositions are generally edible and intended to have moisture barrier properties. A combination of a PVA polymer or copolymer with a midblock sulfonated styrenic block copolymer would therefore have lead most skilled readers to presume the excellent properties of the midblock sulfonated styrenic block copolymer coatings to deteriorate and moreover to deteriorate rapidly over time once the PVA breaks down. It is therefore with considerate surprise and interest that it has been found that improved coatings may be prepared using a composition comprising an aqueous emulsion of a midblock sulfonated styrenic block copolymer in combination with a poly(vinyl alcohol).

Commercially available poly(vinyl alcohol) polymers, derivatives and copolymers thereof may be used.

The poly(vinyl alcohol) used in the coating composition of the present invention is preferably a hydrolyzed or partially hydrolyzed poly(vinyl alcohol). The expression partially hydrolyzed PVAs refers to PVAs that are commonly hydrolysed within the range of 40 to 96%. Hydrolyzed PVAs are hydrolyzed to even greater degree, up to 99+%. Suitably a hydrolyzed PVA is used. The PVA may have a broad molecular weight distribution or a narrow one. Moreover, the PVA may have a small weight average molecular weight e.g., in the range of 9,000 to 10,000 up to a relatively high weight average molecular weight, e.g., in the range of 146,000 to 186,000. PVAs with a higher average molecular weight, e.g., 205,000 g/mol, may be used as well. A hydrolyzed poly(vinyl alcohol) can be prepared by radical-polymerizing vinyl acetate, and appropriately hydrolyzing the resulting vinyl acetate. In order to prepare a desired poly (vinyl alcohol), this is attained by appropriately controlling a polymerization degree and a hydrolyzation degree by the per se known method.

A commercially available product of such partially hydrolyzed poly(vinyl alcohol) can be used, and examples of a commercially available product of preferable poly(vinyl alcohol) include Gosenol EGOS, EG25 (manufactured by The Nippon Gohsei Co., Ltd.), PVA203 (manufactured by Kuraray Co., Ltd.), PVA204 (manufactured by Kuraray Co., Ltd.), PVA205 (manufactured by Kuraray Co., Ltd.), JP-04 (manufactured by JAPAN VAM & POVAL CO., LTD), and JP-05 (manufactured by JAPAN VAM & POVAL CO., LTD). Also Selvol™ poly(vinyl alcohol)s by Sekisui may be used, which includes super hydrolyzed, fully hydrolyzed, intermediate hydrolyzed and partially hydrolyzed poly(vinyl alcohol)s, sorted by viscosity. An interesting supplier of poly(vinylalcohol)s is Sigma Adrich, with grades ranging from 360627 (Mw 9,000-10,000, 80% hydrolyzed), to Miowol® 40-88 (Mw ~205,000, 86.7-88.7% hydrolyzed). Most preferred is the grade 341584 (Mw 89,000-98,000, 99+% hydrolyzed). Obviously similar grades from alternative suppliers may be used as well.

In the production of the present coating composition, the poly(vinyl alcohol) may be used alone or in an appropriate combination of two or more kinds of poly(vinyl alcohol)s having different polymerization degrees and hydrolyzation degrees. For example, a poly(vinyl alcohol) having an average molecular weight of ~9,500 and a poly(vinyl alcohol) having an average molecular weight of 100,000 can be mixed and used.

In the present invention, various modified poly(vinyl alcohol)s can be used. Examples include an amine-modified poly(vinyl alcohol), an ethylene-modified poly(vinyl alcohol), a carboxylic acid-modified poly(vinyl alcohol), a diacetone-modified poly(vinyl alcohol), and a thiol-modified poly(vinyl alcohol). These modified poly(vinyl alcohol)s can be a commercially available product, or a product prepared by the method known in the art.

The PVA most suitably used is Sigma Aldrich (341584). It has a Mw of 89-98 k and is hydrolyzed to >99%

The amount of the one or more midblock sulfonated styrenic block copolymers and the one or more poly(vinyl alcohol)s in the coating composition may vary broadly.

As indicated, preferably, the solids content is in the range of 5 to 70 wt. %, preferably in the range of 10 to 50 wt. %. In this respect, the solids content refers to the combination of the one or more midblock sulfonated styrenic block copolymers and the one or more poly(vinyl alcohol)s.

The ratio of the one or more poly(vinyl alcohol)s versus the one or more midblock sulfonated styrenic block copolymers may vary. It varies with the nature of the individual components. Preferably, the ratio by weight of the poly (vinyl alcohol)s versus the one or more midblock sulfonated styrenic block copolymers is in the range of 1:1 to 1:1000, more preferably from 1:1.2 to 1:200, even more preferably from 1:1.5 to 1:150.

It is not known why the addition of PVA to the coating composition actually improves the wash durability of the coated fabrics. The inventors found that the addition of the PVA to the emulsion allows them to cast a film from the emulsion that does not break apart in water as may happen with an unmodified emulsion. This is indicative of enhanced coalescence of the polymer particles with the addition of the PVA. However, it is not this effect alone that explains the improved and highly desired wash ability. Apparently, and highly surprisingly, the PVA also positively affects the durability of the coating, although additional processing considerations have to be employed.

Preferably, the PVA is dissolved into the emulsion at an elevated temperature. This may be a temperature in the range of 50 to 100° C., preferably a temperature in the range of 70 to 95° C., most preferably about 90° C.

As indicated, the current invention also concerns a method for preparing a coating composition. The step of preparing an aqueous emulsion of a midblock sulfonated block copolymer has been described earlier in the specification. Next, the PVA is added to the emulsion, as described directly above. Thus, the invention provides a method comprising:

emulsifying a midblock sulfonated block copolymer dissolved in a hydrocarbon solvent with water;

removing the hydrocarbon solvent; and dissolving the PVA into the emulsion at a temperature in the range of 50 to 100° C. Moreover, the current invention also concerns an alternative method, wherein the PVA or part thereof is dissolved into the hydrocarbon solvent wherein the midblock sulfonated block copolymer is dissolved and/or wherein the PVA or part thereof is dissolved in the water that is used for emulsifying the midblock sulfonated block copolymer and/or wherein the PVA or part thereof is added during the emulsification step. Moreover, both methods may be combined.

The invention also concerns a method for preparing a fabric with enhanced evaporative cooling effect, which comprises applying the coating composition of the current invention onto the fabric, and applying additional heat and optionally pressure. The coating itself may be applied by screen printing or similar techniques. The coating may be applied in the form of dots or patterns or artistic designs. For some applications the fabric is fully coated. The application of a combination of heat and pressure is used to achieve improved durability of the coating, with heat being the overwhelming driver. There are two processes that may be used.

One is simply drying of the coating at elevated temperatures for a short period (e.g., at a temperature in the range of 50-80° C., for less than a minute in an oven).

In the other process a calendaring roll, or equivalent process, is used to generate additional heat (and pressure) to "complete" the bonding process. These two processes may be used independently or may be combined to achieve optimal durability.

Although the nature of the synergy remains unclear to the inventors, maximum durability of the coated emulsion and thus the most preferred embodiment of the present invention, can only be obtained through the combination of PVA addition at elevated temperatures with a post-coating thermal treatment. Independently, either of these modifications will improve coating durability but it is only through the combination that the desired maximum durability can be achieved.

Ideal conditions may be easily found by a person skilled in the art. The inventors have found various process windows e.g., when using a calendaring roll, as well as optimal parameters for many other variables ([PVA], dissolution temp, drying time, drying temp). Although not intended to limit the scope of the invention, these are described herein below as an aid to the skilled reader. All of these process conditions ultimately combine to generate a coating from the emulsion that will withstand a minimum of 50 wash cycles on most substrates while generating the desired cooling effect (in other words, equivalent to what we observe from the solvent based coatings).

Interestingly, the inventors also found that the use of PVA in the coatings allow for the preparation of airtight coatings. Thus, whereas coalescing agents may be used, as well as thickening agents to improve the film forming properties of the coating composition, it has been found quite surprisingly that PVAs also allow the preparation of coatings that are truly airtight. This is tested by applying vacuum to one side of the coated fabric and measuring the change in pressure over time. If the under pressure is lost, then the coating is porous.

EXAMPLES

Emulsions were prepared using the following materials:

| | |
|---|---|
| MD9200 | A sulfonated styrenic block copolymer pentablock copolymer with a structure tBS-EP-sPS-EP-tBS, wherein the tBS blocks each have an average MW of about 10,000, the EP blocks each have an average MW of about 12.000 and the interior sPS block has an average MW of about 22.000, with an ion exchange capacity (IEC) of 2.0 mmole/g. (10.5% m solids in an apolar solvent mixture of 1:1 cyclohexane/heptane) |

-continued

| | |
|---|---|
| PVA | Sigma Aldrich (341584). It has a Mw of 89-98k and is hydrolyzed to >99% |
| Fabric 1 | A plain 100% polyester knit |
| Fabric 2 | A plain Modacrylic knit, i.e., modified acrylic fibers made from acrylonitriles |

Equipment used in the experiments was an Ultra-Turrax™ T25. A Combimag RCT water bath from IKA was used, as well as a rotovap RV05, also from IKA.

The solids content of the emulsions was determined by drying a sample in an oven (Gallenkamp Plus oven) at 130° C. for 15 minutes.

A coating was applied in the form of dots onto the fabric in the following experiments using a screen printing process. In examples 1 and 2, a Carver press was used to generate the temperature and pressure following air drying of the coated fabric. The coated fabric was allowed to air dry under ambient conditions or placed in a convection oven at different times and temperatures. Once dry, the coated fabric was subjected to additional heat and pressure using a Chem-instruments Hot Roll Laminator. In Example 3, a hot roll laminator has been used, to simulate realistic run rates.

To test the durability of the applied coating, a Haier HLP21N type washing machine, using a normal cycle and Tide laundry detergent were used.

Coating Composition 1

20 grams of MD9200 solution were mixed with 30 grams of water in the T25 at 13500 rpm. After stripping off the solvent under reduced pressure at elevated temperature a stable emulsion was obtained.

Coating Composition 2

Coating composition 1 was heated to a temperature of about 90° C. At this temperature 0.2 wt. % PVA, calculated on a total solution basis was added.

Coating Composition 3

Coating composition 1 was heated to a temperature of about 90° C. At this temperature 0.5 wt. % PVA, calculated on a total solution basis was added.

Coating Composition 4

Coating composition 1 was heated to a temperature of about 90° C. At this temperature 0.8 wt. % PVA, calculated on a total solution basis was added.

Experiment 1

Composition 1 was applied on Fabric 1 at various temperatures and pressure conditions. For results, see FIG. 1 and Table 1. The coating composition was applied using a screen printing process.

Next the fabric was placed in a washing machine. The number of hot water wash cycles (at 50-55° C.) was determined. The intent was to perform at least 20 wash cycles to determine whether some durability could be achieved. If any of the coating has disappeared, it was concluded that the coating reached the maximum number of hot water wash cycles.

The images in FIG. 1, show a fabric on which the coating is applied in the form of dots. The image shows the applied coating before and after a single wash cycle. It can be seen that a significant part of the coating (dots) has disappeared in the absence of a heat treatment when applying the coating composition and in the absence of a PVA in the coating composition. The results in Table 1 illustrate that a heat/pressure treatment helps (in the absence of the addition of PVA), but a minimum of 50 hot water wash cycles is not reached.

TABLE 1

| | Thermal Treatment | | | Hot Water Washes |
|---|---|---|---|---|
| Fabric | Temp. (° C.) | Pressure (MPa) | Time (mins) | # of cycles |
| 100% Polyester | 66 | 69 | 2 | 1 |
| | 66 | 103 | 1 | 1 |
| | 121 | 69 | 2 | 7 |
| | 121 | 103 | 1 | 8 |
| | 149 | 69 | 1 | 11 |
| | 149 | 103 | 1 | 12 |
| | 149 | 138 | 1 | 12 |
| | 177 | 69 | 1 | 20 |

Experiment 2

Experiment 1 was repeated with coating compositions 1, 2 and 3 in accordance with the conditions set out in Table 2. The number of wash cycles increased when using a coating composition comprising a PVA. The results are still not ideal. The time associated with the heat treatment is too long. One minute of thermal treatment, which was used in this experiment, would not be practical for the continuous process that would be anticipated to produce commercially viable quantities. In addition to the improvement in wash durability, it was also observed that film stability in water was significantly improved by the addition of the PVA. Thus, the film fell apart without addition of PVA, whereas it remained intact when PVA was added.

TABLE 2

| % PVA Addition | Solution Temp. ° C. | Film Stability in deionized Water | # of washes survived after 204° C. treatment |
|---|---|---|---|
| 0 | RT | No | 11 |
| 0 | 90 | No | 11 |
| 0.2 | 90 | Yes | 20 |
| 0.5 | 90 | Yes | 20 |

Experiment 3

Experiment 1 was repeated with coating composition 4 (comprising 0.8 wt. % PVA). The composition was applied on 3 different fabrics. The nip speed refers to the setting of the laminator, and is therefore an indication of the application time of the coating. It is a dimensionless unit. A nip speed of less than 3 is commercially less attractive.

In all instances the number of washes passed the limit of 50. The results are set out in Table 3.

TABLE 3

| Item # | Temp. ° C. | Nip speed | Number of washes |
|---|---|---|---|
| 100% PE | | | |
| 1 | 104 | 2 | 50 |
| 2 | 107 | 3 | 50 |
| 3 | 107 | 3.5 | 50 |
| 4 | 127 | 2.5 | 50 |
| 5 | 127 | 3 | 50 |
| 6 | 127 | 3.5 | 50 |
| 7 | 127 | 4 | 50 |
| Modacrylic | | | |
| 1 | 104 | 2 | 50 |
| 2 | 107 | 3 | 50 |

TABLE 3-continued

| Item # | Temp. ° C. | Nip speed | Number of washes |
|---|---|---|---|
| 3 | 107 | 3.5 | 50 |
| 4 | 127 | 2.5 | 50 |
| 5 | 127 | 3 | 50 |
| 6 | 127 | 3.5 | 50 |
| 7 | 127 | 4 | 50 |
| Nylon/Spandex | | | |
| 1 | 104 | 2 | 50 |
| 2 | 107 | 3 | 50 |
| 3 | 107 | 3.5 | 50 |
| 4 | 127 | 2.5 | 50 |
| 5 | 127 | 3 | 50 |
| 6 | 127 | 3.5 | 50 |
| 7 | 127 | 4 | 50 |

Experiment 4

A 20 wt. % PVA (Fluka 4-88, Mw~130000, 86.7-88.7% hydrolyzed) solution was prepared. 5% PVA solution was stirred in the MD9200 emulsion. The emulsion is applied on a white fiber fabric that is 0.5 mm thick. The emulsion is applied with an applicator. Layers of film, each 0.2 mm thick, are applied. The film is dried for 30 minutes at 100° C. After which the film is no longer soluble in water, meaning the film is fully cured. The fiber sheet was airtight after 3 layers of film.

INDUSTRIAL APPLICABILITY

Coating composition, for textiles and other fabrics. Both for breathable textiles with enhanced cooling and in airtight coatings.

The invention claimed is:

1. A textile coating composition comprising an aqueous emulsion of a midblock sulfonated styrenic block copolymer and a poly(vinyl alcohol);

wherein the midblock sulfonated styrenic block copolymer comprises at least two non-sulfonated styrenic polymer end blocks A, at least one interior styrenic polymer block B carrying sulfonyl groups and/or derivates thereof, and one or more interior polymer blocks D that have a glass transition temperature of less than 20° C.;

wherein the coating composition has a solids content, defined by the amount of midblock sulfonated styrenic block copolymer and poly(vinyl alcohol) in the coating composition by weight, in the range of 5 to 70 wt. %; and wherein a ratio of the poly(vinyl alcohol) versus the midblock sulfonated styrenic block copolymer by weight is in the range of 1:1 to 1:200.

2. The coating composition of claim 1, wherein the midblock sulfonated styrenic block copolymer is a mixture of midblock sulfonated styrenic block copolymers.

3. The coating composition of claim 1, comprising a midblock sulfonated styrenic block copolymer of the general configuration A-D-B-D-A, A-B-D-B-A, $(A\text{-}DB)_nX$, $(A\text{-}B\text{-}D)_nX$ or a mixture thereof, where n is an integer from 2 to about 30, X is coupling agent residue.

4. The coating composition of claim 1, comprising a midblock sulfonated styrenic block copolymer of the general configuration $(A\text{-}D\text{-}B)_nX$, where n is 2 or n is an integer from 3 to 6, and X, A, B and D have the defined meaning.

5. The coating composition of claim 4, comprising a midblock sulfonated styrenic block copolymer wherein:

a) each A block independently is a polymer block having an apparent number average molar mass between 1,000 and 60,000 g/mol; and/or b) each D block, if present, independently is a polymer block having an apparent number average molar mass between 1,000 and 60,000 g/mol, and/or c) each B block independently is a polymer block having an apparent number average molar mass between 10,000 and 300,000 g/mol, wherein the term "molar mass" refers to polystyrene equivalent or apparent molar mass of the polymer or block of the copolymer, measured with gel permeation chromatography (GPC) using polystyrene calibration standards, according to ASTMD5296-11, and wherein the molar mass expressed herein is measured at the peak of the GPC trace.

6. The coating composition of claim 5, comprising a midblock sulfonated styrenic block copolymer wherein:

a) each A block independently is a polymer block having an apparent number average molar mass between 5,000 and 40,000 g/mol; and/or b) each D block, if present, independently is a polymer block having an apparent number average molar mass between 2,000 and 40,000 g/mol, and/or c) each B block independently is a polymer block having an apparent number average molar mass between 15,000 and 200,000 g/mol.

7. The coating composition of claim 6, comprising a midblock sulfonated styrenic block copolymer wherein:

a) each A block independently is a polymer block having an apparent number average molar mass between 7,000 and 20,000 g/mol; and/or b) each D block, if present, independently is a polymer block having an apparent number average molar mass between 5,000 and 20,000 g/mol, and/or c) each B block independently is a polymer block having an apparent number average molar mass between 19,000 and 100,000 g/mol.

8. The coating composition of claim 3, comprising a midblock sulfonated styrenic block copolymer having a B block content in the range of 10 to 85% m calculated on the mass of the sulfonated block copolymer.

9. The coating composition of claim 8, comprising a midblock sulfonated styrenic block copolymer having a B block content in the range of 20 to 60% m calculated on the mass of the sulfonated block copolymer.

10. The coating composition of claim 1, comprising a midblock sulfonated styrenic block copolymer having an Ion Exchange capacity in the range of 0.2 to 4.0 mmol per gram midblock sulfonated styrenic block copolymer.

11. The coating composition of claim 1, wherein the solids content is in the range of 10 to 50 wt. %.

12. The coating composition of claim 1, wherein the poly(vinyl alcohol) is a mixture of poly(vinyl alcohol)s.

13. The coating composition of claim 1, wherein the poly(vinyl alcohol) used in the coating composition is a hydrolyzed or partially hydrolyzed poly(vinyl alcohol).

14. The coating composition of claim 13, wherein the poly(vinyl alcohol) used is hydrolyzed to a degree of 99+%.

15. The coating composition of claim 1, wherein the poly(vinyl alcohol) has a weight average molecular weight in the range of 9,000 to 205,000 g/mol.

16. The coating composition of claim 15, wherein the poly(vinyl alcohol) is a hydrolyzed poly(vinyl alcohol) with a weight average molecular weight in the range of 89,000 to 98,000 g/mol and hydrolyzed to >99%.

17. The coating composition of claim 1, wherein the ratio of the poly(vinyl alcohol) versus the midblock sulfonated styrenic block copolymer by weight is in the range of 1:1.5 to 1:150.

18. A method for preparing the textile coating composition of claim 1, which comprises: forming an aqueous emulsion of a midblock sulfonated styrenic block copolymer in water, bringing the aqueous emulsion to a temperature in the range of 50 to 100° C., and dissolving the poly(vinyl alcohol) into the emulsion.

19. A method for preparing a fabric with enhanced evaporative cooling effect, which comprises: applying the textile coating composition of claim 1 onto a fabric, and applying heat and optionally pressure.

20. The method of claim 19, which comprises drying the coating composition at a temperature in the range of 50-80° C., for less than a minute in an oven.

21. The method of claim 20, which comprises applying heat to a temperature in the range of 40-180° C. and pressure in the range of 5 to 1100 kPa.

22. A fabric having enhanced evaporative cooling properties having the coating of any one of claims 1-17 applied thereon.

23. An airtight fabric having one or more layers of coating according to any one of claims 1-17 applied as film thereon.

24. A textile coating composition comprising an aqueous emulsion of a midblock sulfonated styrenic block copolymer and a poly(vinyl alcohol);

wherein the midblock sulfonated styrenic block copolymer comprises at least two non-sulfonated styrenic polymer end blocks A and at least one interior styrenic polymer block B carrying sulfonyl groups and/or derivates thereof;

wherein the poly(vinyl alcohol) used in the coating composition is a hydrolyzed or partially hydrolyzed poly (vinyl alcohol) having a weight average molecular weight in the range of 9,000 to 205,000 g/mol;

wherein the coating composition has a solids content, defined by the amount of midblock sulfonated styrenic block copolymer and poly(vinyl alcohol) in the coating composition by weight, in the range of 5 to 70 wt. %;

wherein the coating composition comprises greater than or equal to 0.8 wt % of the poly(vinyl alcohol) based on the total weight of the coating composition; and wherein a ratio of the poly(vinyl alcohol) versus the midblock sulfonated styrenic block copolymer by weight is in the range of 1:1 to 1:200.

* * * * *